(12) United States Patent
Ikadai et al.

(10) Patent No.: US 8,049,860 B2
(45) Date of Patent: Nov. 1, 2011

(54) GLASS SUBSTRATE FOR REFLECTIVE MIRROR, REFLECTIVE MIRROR INCLUDING THE GLASS SUBSTRATE, GLASS SUBSTRATE FOR LIQUID CRYSTAL PANEL, AND LIQUID CRYSTAL PANEL INCLUDING THE GLASS SUBSTRATE

(75) Inventors: Masahiro Ikadai, Tokyo (JP); Hirohiko Iwase, Tokyo (JP); Naoki Kinugasa, Tokyo (JP)

(73) Assignee: Nippon Sheet Glass Company, Ltd., Tokyo (JP)

( * ) Notice: Subject to any disclaimer, the term of this patent is extended or adjusted under 35 U.S.C. 154(b) by 504 days.

(21) Appl. No.: 12/308,905

(22) PCT Filed: Jun. 29, 2007

(86) PCT No.: PCT/JP2007/063522
§ 371 (c)(1),
(2), (4) Date: Feb. 12, 2009

(87) PCT Pub. No.: WO2008/001954
PCT Pub. Date: Jan. 3, 2008

(65) Prior Publication Data
US 2009/0323008 A1 Dec. 31, 2009

(30) Foreign Application Priority Data
Jun. 30, 2006 (JP) .................................. 2006-182616

(51) Int. Cl.
*G02F 1/1333* (2006.01)
*G02F 1/1335* (2006.01)
*G03B 21/56* (2006.01)
*G03B 21/28* (2006.01)
*G02B 5/08* (2006.01)
*C09K 19/00* (2006.01)

(52) U.S. Cl. ............ 349/158; 349/5; 359/449; 359/838; 353/77; 428/1.32

(58) Field of Classification Search ................ 349/158, 349/5; 359/449, 838; 353/77; 428/1.32
See application file for complete search history.

(56) References Cited

U.S. PATENT DOCUMENTS
2001/0004283 A1* 6/2001 Akimoto et al. ................. 353/77

FOREIGN PATENT DOCUMENTS
| JP | 2001-235798 A | 8/2001 |
| JP | 2006-137631 A | 6/2006 |
| JP | 2006-267883 A | 10/2006 |

OTHER PUBLICATIONS

International Preliminary Report on Patentability and Written Opinion of the International Searching Authority (8 pages) dated Jan. 29, 2009, issued in connection with International Application Serial No. PCT/JP2007/063522.

* cited by examiner

*Primary Examiner* — Mike Qi
(74) *Attorney, Agent, or Firm* — Holtz, Holtz, Goodman & Chick, P.C.

(57) ABSTRACT

A glass substrate for a reflective mirror of a rear projection television (RPTV) which ensures display quality by quantitative control, and can reduce control cost and manufacture cost is provided. A reflective mirror 3 of the rear projection television (RPTV) includes a float glass plate (glass substrate) 1 formed to have a plate thickness of 3 mm by a float process, and a reflection enhancing film 2 constituted of aluminum (Al) formed on one surface 1*a* of the glass substrate 1 by a sputtering method. In the measurement condition of a cut-off value of 0.8 to 8 mm, the maximum amplitude of a filtered waviness curve is 0.1 μm or less, the maximum value of a viewability index value $\gamma$ ($=A/D^3$) in a range of spatial frequencies 2 to 500/mm by spectral analysis of the filtered waviness curve is 0.02 (/m²) or less, and an integral value of the viewability index value $\gamma$ is 2.0 (/m³) or less.

20 Claims, 13 Drawing Sheets

FIG.10

| SAMPLE | CUT-OFF VALUE (mm) | AMPLITUDE ($\mu$/m) | MAXIMUM VALUE OF CONTRAST C | $A/D^2$ (/m) | MAXIMUM VALUE OF $\gamma (=A/D^3)$ (/$m^2$) | INTEGRAL VALUE OF $\gamma (=A/D^3)$ (/$m^3$) | REFLECTED IMAGE CHECK | |
|---|---|---|---|---|---|---|---|---|
| | | | | | | | WITH DRAW LINE CONTROL | WITHOUT DRAW LINE CONTROL |
| EXAMPLE 1 | 8 | 0.07 | 5.50*$10^{-5}$ | 0.0070 | 0.020 | 1.93 | ○ | × |
| EXAMPLE 2 | 8 | 0.07 | 2.70*$10^{-5}$ | 0.0034 | 0.008 | 0.82 | ○ | ○ |
| EXAMPLE 3 | 8 | 0.10 | 3.27*$10^{-5}$ | 0.0027 | 0.006 | 0.48 | ◎ | ◎ |
| SAMPLE 1 | 8 | 0.10 | 4.00*$10^{-5}$ | 0.0055 | 0.013 | 1.50 | ○ | △ |
| SAMPLE 2 | 8 | 0.12 | 3.17*$10^{-5}$ | 0.0050 | 0.015 | 1.39 | ○/△ | △ |
| SAMPLE 3 | 8 | 0.08 | 3.46*$10^{-5}$ | 0.0043 | 0.010 | 1.09 | ○ | △ |
| SAMPLE 4 | 8 | 0.07 | 3.41*$10^{-5}$ | 0.0050 | 0.010 | 1.32 | ○ | △ |
| SAMPLE 5 | 8 | 0.08 | 3.10*$10^{-5}$ | 0.0045 | 0.008 | 1.14 | ○ | △ |
| SAMPLE 6 | 8 | 0.08 | 2.69*$10^{-5}$ | 0.0037 | 0.008 | 0.87 | ○ | ○ |
| SAMPLE 7 | 8 | 0.10 | 4.84*$10^{-5}$ | 0.0068 | 0.016 | 1.81 | ○ | × |
| SAMPLE 8 | 8 | 0.09 | 6.43*$10^{-5}$ | 0.0058 | 0.010 | 1.41 | ○ | △ |
| SAMPLE 9 | 8 | 0.11 | 5.25*$10^{-5}$ | 0.0065 | 0.014 | 1.60 | ○/△ | × |
| SAMPLE 10 | 8 | 0.09 | 5.67*$10^{-5}$ | 0.0057 | 0.010 | 1.41 | ○ | △ |
| SAMPLE 11 | 8 | 0.12 | 3.86*$10^{-5}$ | 0.0052 | 0.012 | 1.36 | ○/△ | × |
| SAMPLE 12 | 8 | 0.14 | 3.19*$10^{-5}$ | 0.0045 | 0.012 | 1.22 | ○/△ | × |
| SAMPLE 13 | 8 | 0.14 | 3.05*$10^{-5}$ | 0.0040 | 0.008 | 1.02 | ○/△ | △ |

FIG.11

| SAMPLE | CUT-OFF VALUE (mm) | AMPLITUDE (μ/m) | MAXIMUM VALUE OF CONTRAST C | A/D² (/m) | MAXIMUM VALUE OF γ (=A/D³) (/m²) | INTEGRAL VALUE OF γ (=A/D³) (/m³) | REFLECTED IMAGE CHECK | |
|---|---|---|---|---|---|---|---|---|
| | | | | | | | WITH DRAW LINE CONTROL | WITHOUT DRAW LINE CONTROL |
| SAMPLE 14 | 8 | 0.13 | 4.61*10⁻⁵ | 0.0063 | 0.014 | 1.60 | ○/△ | × |
| SAMPLE 15 | 8 | 0.12 | 6.99*10⁻⁵ | 0.0071 | 0.015 | 1.75 | ○/△ | × |
| SAMPLE 16 | 8 | 0.13 | 6.56*10⁻⁵ | 0.0090 | 0.027 | 2.32 | × | × |
| SAMPLE 17 | 8 | 0.11 | 9.16*10⁻⁵ | 0.0096 | 0.017 | 2.18 | △ | × |
| SAMPLE 18 | 8 | 0.13 | 6.63*10⁻⁵ | 0.0053 | 0.009 | 1.10 | ○/△ | △ |
| SAMPLE 19 | 8 | 0.13 | 5.08*10⁻⁵ | 0.0054 | 0.016 | 1.34 | ○/△ | × |
| SAMPLE 20 | 25 | 0.61 | 1.27*10⁻⁴ | 0.0269 | 0.063 | 8.94 | ○/△ | ○/△ |
| SAMPLE 21 | 25 | 0.60 | 1.57*10⁻⁴ | 0.0313 | 0.078 | 10.50 | ○/△ | △ |
| SAMPLE 22 | 25 | 0.59 | 2.30*10⁻⁴ | 0.0369 | 0.106 | 12.45 | ○/△ | × |
| SAMPLE 23 | 25 | 0.72 | 2.27*10⁻⁴ | 0.0413 | 0.110 | 14.04 | ○/△ | × |
| SAMPLE 24 | 25 | 0.30 | 1.33*10⁻⁴ | 0.0267 | 0.065 | 9.12 | ○ | ○ |
| SAMPLE 25 | 25 | 0.37 | 1.50*10⁻⁴ | 0.0292 | 0.075 | 9.97 | ○ | ○ |
| SAMPLE 26 | 25 | 0.48 | 2.71*10⁻⁴ | 0.0396 | 0.134 | 13.63 | ○/△ | × |
| SAMPLE 27 | 25 | 0.69 | 2.93*10⁻⁴ | 0.0567 | 0.146 | 19.61 | ○/△ | × |
| SAMPLE 28 | 25 | 0.70 | 3.22*10⁻⁴ | 0.0486 | 0.158 | 16.75 | ○/△ | × |
| SAMPLE 29 | 25 | 0.75 | 3.70*10⁻⁴ | 0.0535 | 0.177 | 18.32 | ○/△ | × |
| SAMPLE 30 | 25 | 0.47 | 2.45*10⁻⁴ | 0.0493 | 0.122 | 16.78 | ○ | × |
| SAMPLE 31 | 25 | 0.64 | 2.26*10⁻⁴ | 0.0466 | 0.113 | 15.53 | ○/△ | × |
| SAMPLE 32 | 25 | 0.98 | 4.27*10⁻⁴ | 0.0841 | 0.212 | 29.07 | ○/△ | × |
| SAMPLE 33 | 25 | 1.17 | 4.43*10⁻⁴ | 0.0876 | 0.221 | 30.36 | ○/△ | × |

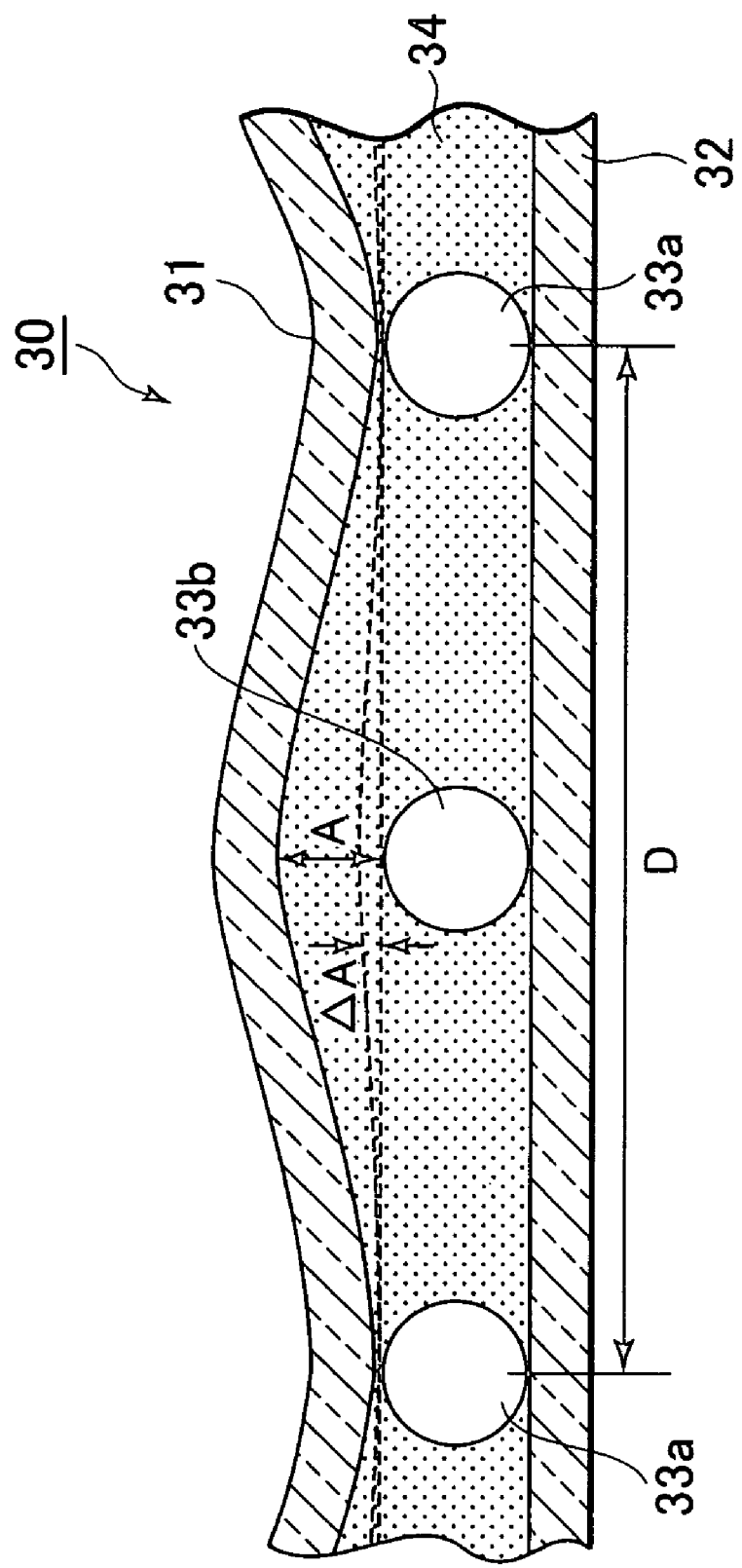

GLASS SUBSTRATE FOR REFLECTIVE MIRROR, REFLECTIVE MIRROR INCLUDING THE GLASS SUBSTRATE, GLASS SUBSTRATE FOR LIQUID CRYSTAL PANEL, AND LIQUID CRYSTAL PANEL INCLUDING THE GLASS SUBSTRATE

This application is a U.S. National Phase Application under 35 USC 371 of International Application PCT/JP2007/063522 filed Jun. 29, 2007.

TECHNICAL FIELD

The present invention relates to a glass substrate for a reflective mirror, a reflective mirror including the glass substrate, a glass substrate for a liquid crystal panel, and a liquid crystal panel including the glass substrate, and more particularly, to a glass substrate for a reflective mirror of a rear projection television (RPTV), a reflective mirror including the glass substrate, a glass substrate for a liquid crystal panel, and a liquid crystal panel including the glass substrate.

BACKGROUND ART

As a substrate for a reflective mirror of a general rear projection television (RPTV), a float glass plate of a board thickness of 3 to 5 mm is used. The float glass plate has waves in the direction perpendicular to the flow direction of the float, and the wave continues in the direction of the flow of the float. More specifically, on the float glass plate, a streaked pattern (microscopic wavy irregularities) is formed in the direction parallel to the flow direction of the float. The microscopic wavy irregularity has an influence on the optical uniformity of the surface reflection. Therefore, when a number of irregularities are formed on a float glass plate, streaked unevenness (light and dark pattern) due to high and low intensities of light may be formed on the reflected image. An MTF method for determining whether or not a streaked light and dark pattern is formed on the reflected image of a float glass plate by quantitatively extracting the distortion of the reflected image and evaluating it, and the total visual inspection for determining whether or not all float glass plates reach the good item reference level by visually determining the reflected images which are actually projected are carried out. As the result of these evaluations, it has been found out that matching the flow direction of the float with the wide angle diffusion direction of the projection system brings about a good result in the visual inspection.

Thus, the display performance of rear projection televisions (RPTV) is maintained by carrying out total visual inspection of the reflected images actually projected after carrying out the draw line control which makes the wide angle diffusion direction of the projection system, namely, the long side direction of the float glass plate, and the flow direction of the float parallel to each other, for the float glass plates for use in the reflective mirrors of the rear projection televisions (RPTV).

Further, it is already disclosed that in the reflective mirror for use in a rear projection type display or the like, at least one surface of a glass substrate is polished so as to have a predetermined surface roughness (0.05 μm or less under the measurement condition of the cutoff value of 0.8 mm to 8 mm) (for example, see Japanese Laid-Open Patent Publication (Kokai) No. 2001-235798).

Meanwhile, as a glass substrate for use in a liquid crystal panel, a float glass plate of a plate thickness of 0.2 to 1.1 mm (±0.1 mm) is usually used. When a liquid crystal panel is manufactured by using the float glass plate as the glass substrate, color unevenness may occur to the liquid crystal panel due to the abovementioned wave. Therefore, in order that the liquid crystal panels reach the good item reference level, inspection of the quality of the glass substrates for use in the liquid crystal panels is carried out.

However, the abovementioned total visual inspection is generally carried out by making white display by placing a reflective mirror in the projection system of a rear projection television (RPTV) and by an inspector observing the light and dark patterns on the screen at a predetermined distance to make judgment of presence or absence of a streaked pattern, and therefore, the inspection depends on the visual acuity and memory of the inspector. Therefore, the good item reference level is likely to vary depending on daily change in the conditions, and the quality of the float glass plate cannot be quantified. Thus, it is necessary to set the good item reference level to be higher, and excessively high quality is brought about.

Further, in order to perform the total visual inspection, the number of the projection systems of rear projection televisions (RPTV) has to be increased in accordance with increase in the number of objects to be inspected. Therefore, the capital investment and human cost increase, and cost reduction by mass production cannot be carried out to result in cost increase.

Further, the draw line control needs to match the flow direction of the float glass plate with the long side direction of the float glass plate, and therefore, the degree of freedom of glass cutting decreases. As a result, yield reduces and cost increases as compared with the case in which the draw line control is not carried out.

Meanwhile, in the liquid crystal panels, color unevenness sometimes occurs even in the liquid crystal panels using the glass substrates determined to be within the standard in the index (for example, amplitude) of the quality inspection of the glass substrate used at present, or color unevenness does not sometimes occur even in the liquid crystal panels using the glass substrates which are determined as non-standard, and the index of the quality inspection and the good item reference level of the liquid crystal panel do not correspond to each other.

Therefore, in order to manufacture the liquid crystal panels at the good item reference level reliably, excessive polishing needs to be performed for the float glass plates, as a result of which, tact time becomes long, and cost increases.

The invention is made in view of the problems as above. An object of the invention is to provide a glass substrate for a reflective mirror, the reflective mirror including the glass substrate, a glass substrate for a liquid crystal panel and a liquid crystal panel including the glass substrate, which secure display quality by quantitative control and can reduce control cost and manufacturing cost.

DISCLOSURE OF THE INVENTION

In order to attain the above described object, according to the first aspect of the present invention, there is provided a glass substrate for a reflective mirror, wherein in a measurement condition of a cut-off value of 0.8 to 8 mm, a maximum amplitude of a filtered waviness curve is 0.1 μm or less, a maximum value of a viewability index value γ expressed by the following formula (1) in a range of spatial frequencies of 2 to 500/mm by spectral analysis of the filtered waviness curve is 0.02 (/m²) or less, $$\gamma = A/D^3 \tag{1}$$

(where A represents each amplitude (m) in a range of spatial frequencies of 2 to 500/mm, and D represents each period (m) in a range of spatial frequencies of 2 to 500/mm), and an integral value of the viewability index value γ is 2.0 (/m$^3$) or less.

In the first aspect of the present invention, in the above described glass substrate for a reflective mirror, a maximum value of the viewability index value γ is preferably 0.01 (/m$^2$) or less, and an integral value of the viewability index value γ is preferably 1.0 (/m$^3$) or less.

In the first aspect of the present invention, in the above described glass substrate for a reflective mirror, the maximum value of the viewability index value γ is preferably 0.006 (/m$^2$) or less, and the integral value of the aforesaid viewability index value γ is preferably 0.6 (/m$^3$) or less.

In the first aspect of the present invention, the above described glass substrate for a reflective mirror is preferably such that in a measurement condition of a cut-off value of 0.8 to 25 mm, a maximum amplitude of a filtered waviness curve is 0.5 μm or less, a maximum value of a viewability index value γ expressed by the following formula (1) in a range of spatial frequencies of 2 to 500/mm by spectral analysis of the filtered waviness curve is 0.2 (/m$^2$) or less, $$\gamma = A/D^3 \quad (1)$$

(where A represents each amplitude (m) in a range of spatial frequencies of 2 to 500/mm, and D represents each period (m) in a range of spatial frequencies of 2 to 500/mm), and an integral value of the viewability index value γ is 20.0 (/m$^3$) or less.

In the first aspect of the present invention, the above described glass substrate for a reflective mirror is preferably such that a maximum value of the viewability index value γ is 0.1 (/m$^2$) or less, and an integral value of the viewability index value γ is 10.0 (/m$^3$) or less.

In the first aspect of the present invention, it is preferable in the above described glass substrate for a reflective mirror, the maximum value of the viewability index value γ is 0.06 (/m$^2$) or less, and an integral value of the viewability index value γ is 6.0 (/m$^3$) or less.

In order to attain the above described object, according to a second aspect of the present invention, there is provided a reflective mirror including the above described glass substrate for a reflective mirror.

In order to attain the above described object, according to a third aspect of the present invention, there is provided a glass substrate for a liquid crystal panel, wherein a plate thickness is 0.2 to 1.1 mm (±0.1 mm), and in a measurement condition of a cut-off value of 0.8 to 8 mm, a viewability index value γ expressed by the following formula (1) in a range of spatial frequencies of 2 to 500/mm by spectral analysis of a filtered waviness curve is 0.0004 (/m$^2$) or less, or the viewability index value γ is 5.0×10$^{-9}$/D$^3$ (/m$^2$) or less.

$$\gamma = A/D^3 \quad (1)$$

(where A represents an amplitude (m) of the filtered waviness curve of the glass substrate, and D represents a period (m) of the filtered waviness curve of the glass substrate).

In the third aspect of the present invention, the above described glass substrate for a liquid crystal panel is preferably manufactured by a float process.

In the third aspect of the present invention, it is preferable that in the above described glass substrate for a liquid crystal panel, when the period of the filtered waviness curve is not less than 2 mm and less than 8 mm, another index value ε expressed by the following formula (2) is 3.5×10$^{-7}$ or less.

$$\epsilon = A/D \quad (2)$$

In order to attain the above described object, according to a fourth aspect of the present invention, there is provided a liquid crystal panel including two glass substrates opposed to each other, a liquid crystal layer interposed between the two glass substrates, and spacers disposed to abut on each of opposed surfaces of the two glass substrates, wherein the glass substrate is the above described glass substrate for a liquid crystal panel.

BRIEF DESCRIPTION OF THE DRAWINGS

FIG. 4A is a graph showing illuminance waveform data.

FIG. 10 is a table showing the evaluation result including examples 1 to 3 of the present invention.

FIG. 11 is a table showing the evaluation result including examples 1 to 3 of the present invention.

FIG. 12 is a sectional view schematically showing the configuration of a liquid crystal panel according to another embodiment of the present invention.

BEST MODE FOR CARRYING OUT THE INVENTION

Hereinafter, a glass substrate for a reflective mirror and a reflective mirror including the same according to an embodiment of the present invention will be described in detail with reference to the drawings.

Figure 1:
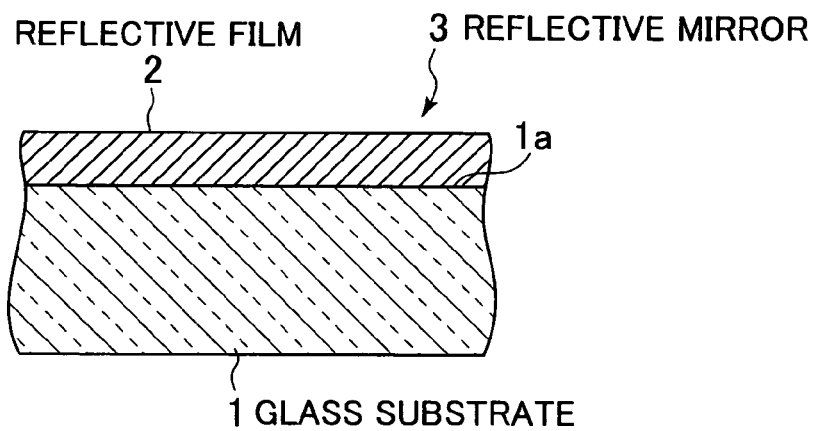
FIG. 1 is a sectional view schematically showing the configuration of a reflective mirror according to an embodiment of the present invention.

FIG. 1 is a sectional view schematically showing the configuration of a reflective mirror according to the embodiment of the present invention.

In FIG. 1, a reflective mirror 3 of a rear projection television (RPTV) includes a float glass plate (glass substrate) 1 which is formed to have a plate thickness of 3 mm by a float process, and a reflection enhancing film 2 which is composed of aluminum (Al) and is formed on one surface 1a of the glass substrate 1 by a sputtering method. Here, when the glass substrate 1 is produced by a float process, draw line control of matching the flow direction of the float glass plate with the long side direction of the float glass plate is carried out.

Figure 2:
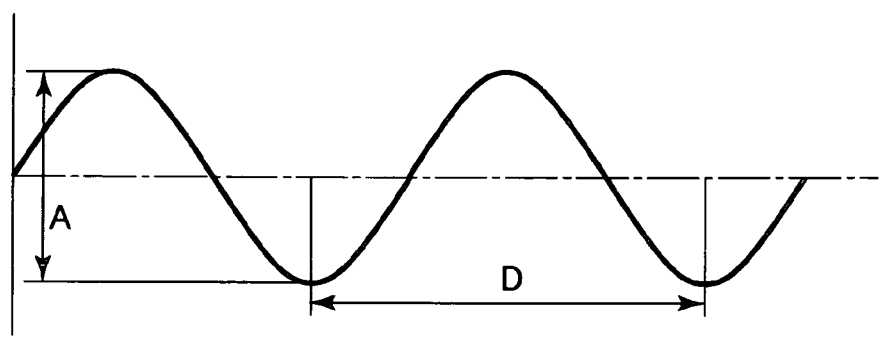
FIG. 2 is a diagram view approximately showing an irregularity on the surface of the glass substrate in FIG. 1.

The microscopic irregularity existing on the surface of the glass substrate 1 is approximated by the sin curve as shown in FIG. 2, and is expressed by the difference in height of the crest and valley (amplitude A) and the length of one period (period D). Display (image quality) of the rear projection television (RPTV) using the above described reflective mirror 3 is subjected to the influence of the amplitude A and the period D of the irregularity on the surface of the above described glass substrate 1. Further, the optical axis of reflection by the period D is approximated by a sin function, and its integral value is coincident with a cos function.

Further, when the required image quality of the rear projection television (RPTV) is considered, it is desirable that the maximum amplitude of the filtered waviness curve is 0.1 μm or less under the measurement condition of the cut-off value of 0.8 to 8 mm (the maximum amplitude of the filtered waviness curve is 0.5 μm or less under the measurement condition of the cut-off value of 0.8 to 25 mm). The cut-off value is defined by the JIS B 0601, and the filtered waviness curve is defined by the JIS B 0651.

Figure 3:
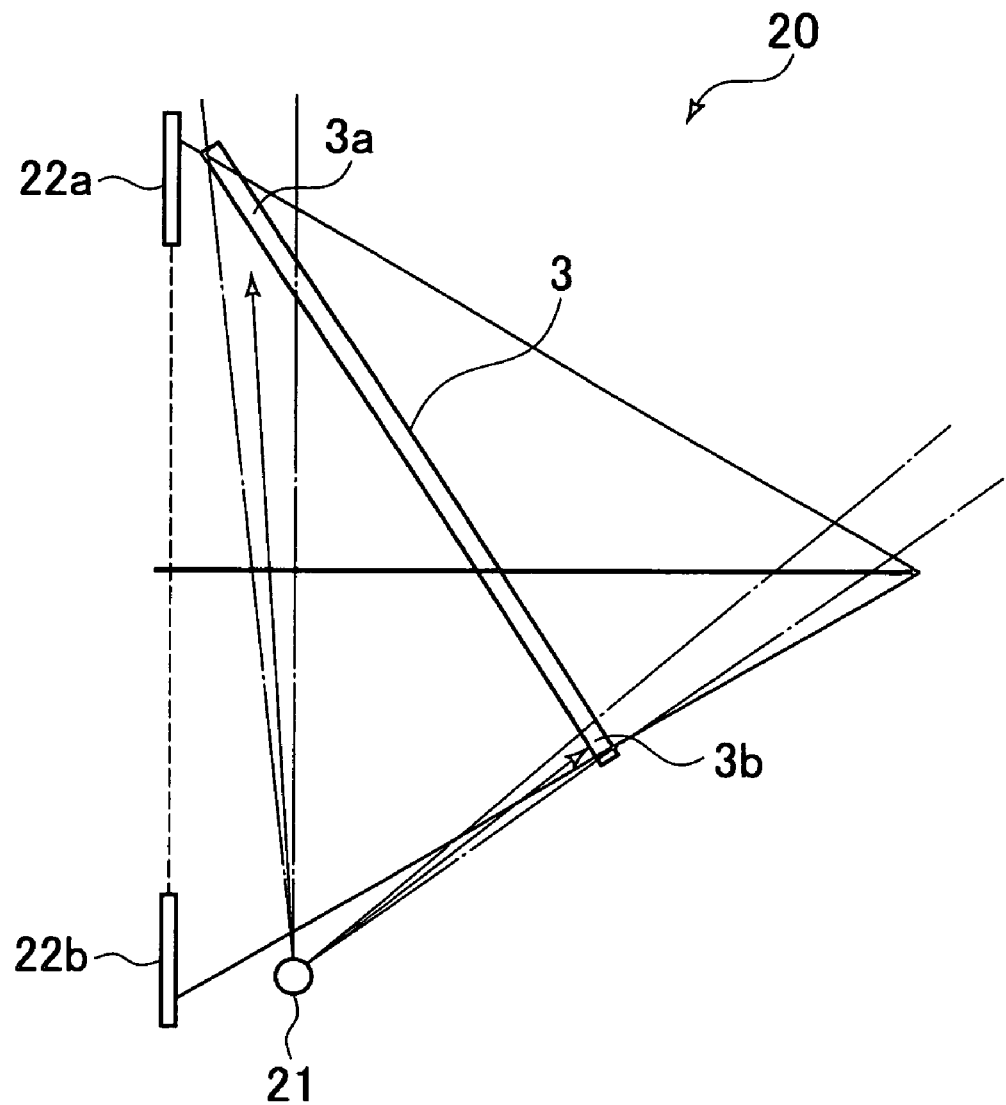
FIG. 3 is a view showing an analysis model of a ray tracing simulation about the glass substrate in FIG. 1.

FIG. 3 is a view showing an analysis model of a ray tracing simulation about the glass substrate in FIG. 1.

In FIG. 3, an analysis model 20 is constituted of a reflective mirror 3, a light source 21, and screens 22a and 22b, and the light rays (light fluxes) emitted from the light source 21 are reflected by an upper portion 3a of the reflective mirror 3 to reach the screen 22a, and are reflected by a lower portion 3b of the reflective mirror 3 to reach the screen 22b. Here, the illuminances of the light rays (light fluxes) which reach the screens 22a and 22b are evaluated respectively.

Figure 4A:
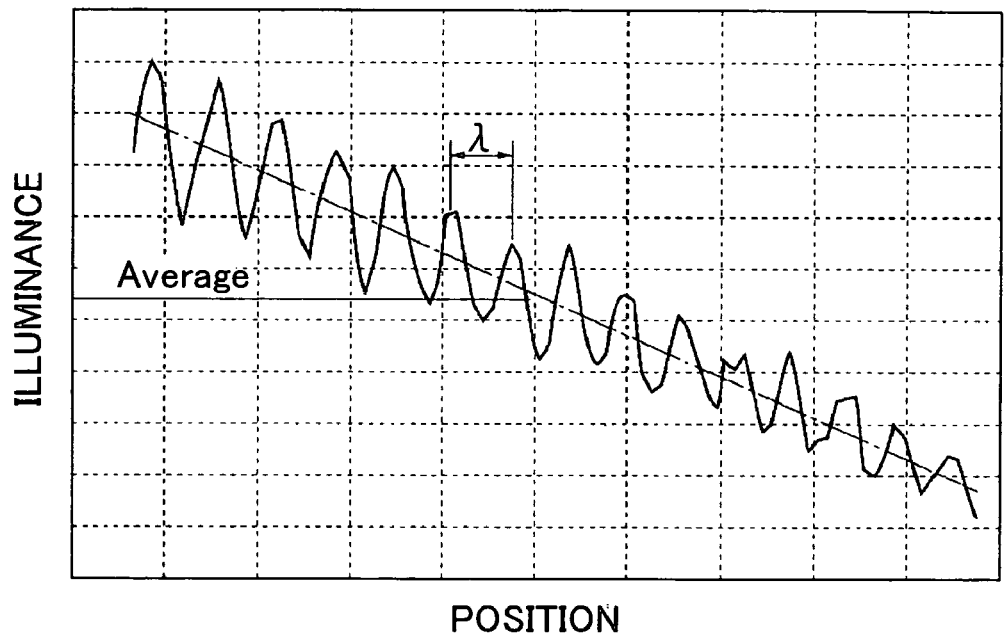
FIGS. 4A and B are graphs showing the evaluation results of the illuminances in the case in which the amplitude of the irregularity of the glass substrate in FIG. 1 is 0.24 μm, and the period is 10 mm.
Figure 4B:
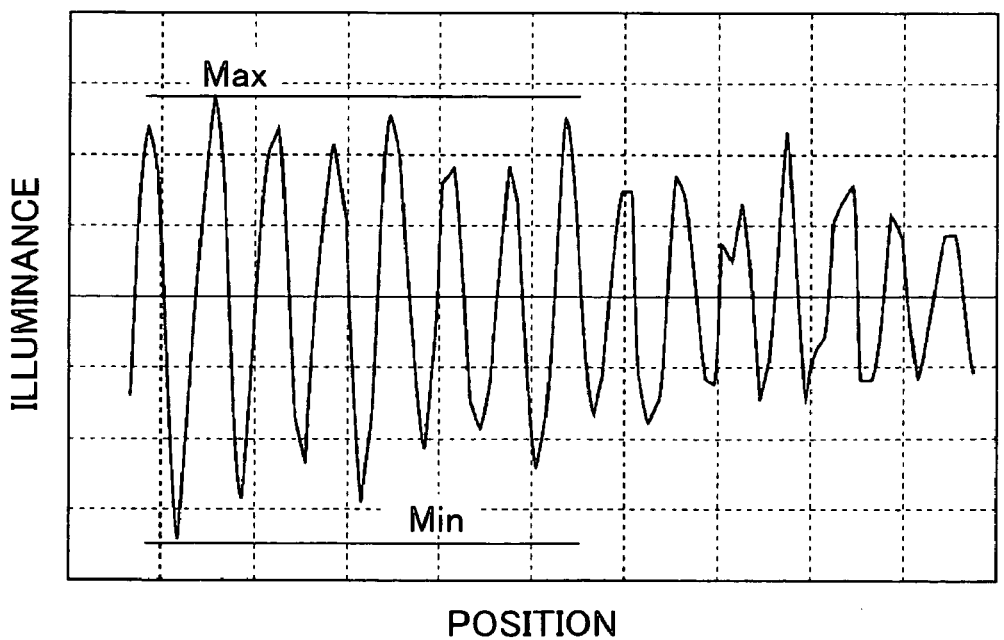
FIG. 4B is a graph with the trend (gradient downward to right) being removed from the illuminance waveform data shown in FIG. 4A.

FIGS. 4A and B are graphs showing the evaluation result of the illuminances in the case in which the amplitude of the irregularity of the glass substrate in FIG. 1 is 0.24 μm and the period is 10 mm. FIG. 4A is a graph showing illuminance waveform data, and FIG. 4B is a graph with the trend (gradient downward to right) being removed from the illuminance waveform data shown in FIG. 4A. Further, by using the average value (Average) of the illuminances in the illuminance waveform data of FIG. 4A, and the maximum value (Max) and the minimum value (Min) of the illuminance in the illuminance waveform data of FIG. 4B, a contrast C (illuminance unevenness) expressing a brightness difference in the period D is evaluated based on the following formula (3).

$$C=((Max+Average)-(Min+Average))/((Max+Average)+(Min+Average))=(Max-Min)/(Max+Min+2\times Average) \quad (3)$$

Figure 5:
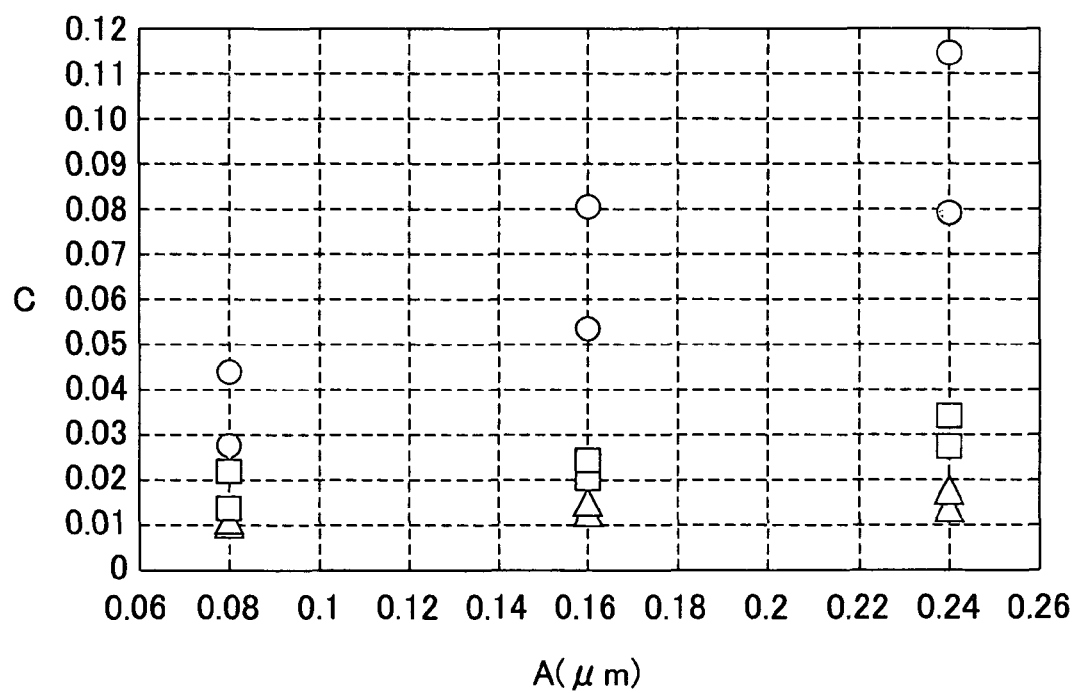
FIG. 5 is a graph showing the relationship of contrast and the amplitude of the irregularity of the glass substrate in the case in which a period of irregularity on the glass substrate in FIG. 1 is 5 to 15 mm.

FIG. 5 is a graph showing the relationship of the contrast and the amplitude of the irregularity on the glass substrate in the case in which the period of the irregularity on the glass substrate in FIG. 1 is 5 to 15 mm. The axis of ordinates represents the contrast C (illuminance unevenness), and the axis of abscissa represents the amplitude A (μm) of the irregularity on the glass substrate 1. Here, ● represents the evaluation result of the image projected on the screen 22a (upper screen) with the period D of the irregularity on the glass substrate 1 being 5 mm, ■ is the evaluation result of the image projected on the screen 22a (upper screen) with the period D of the irregularity on the glass substrate 1 being 10 mm, ▲ A is the evaluation result of the image projected on the screen 22a (upper screen) with the period D of the irregularity on the glass substrate 1 being 15 mm, ○ represents the evaluation result of the image projected on the screen 22b (lower screen) with the period D of the irregularity on the glass substrate 1 being 5 mm, □ represents the evaluation result of the image projected on the screen 22b (lower screen) with the period D of the irregularity on the glass substrate 1 being 10 mm, and Δ represents the evaluation result of the image projected on the screen 22b (lower screen) with the period D of the irregularity on the glass substrate 1 being 15 mm.

From FIG. 5, it is found out that the shorter the period D of the irregularity on the glass substrate 1 is, the larger the variation of the contrast C (illuminance unevenness) relative to the amplitude A (μm) of the irregularity becomes.

Figure 6:
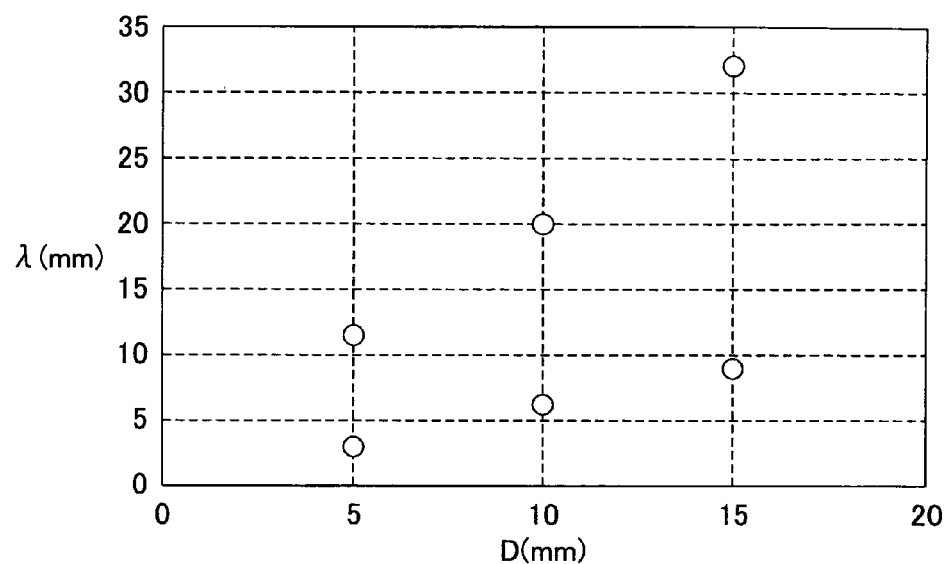
FIG. 6 is a graph showing the relationship of the period of illuminance and the period of irregularity on the glass substrate when the amplitude of the irregularity on the glass substrate in FIG. 1 is 0.08 μm.

FIG. 6 is a graph showing the relationship of the period of the illuminance and the period of the irregularity of the glass substrate when the amplitude of the irregularity of the glass substrate in FIG. 1 is 0.08 μm. The axis of ordinates represents a period λ (mm) of the illuminance, and the axis of abscissa represents the period D (mm) of the irregularity on the glass substrate 1. Here, ● represents the evaluation result of the image projected on the screen 22a (upper screen), and ○ represents the evaluation result of the image projected on the screen 22b (lower screen).

From FIG. 6, it is found out that the period λ (mm) of the illuminance is proportional to the period D (mm) of the irregularity on the glass substrate 1, and that the period λ (mm) of the illuminance is shorter on the screen 22a (upper screen).

Figure 7:
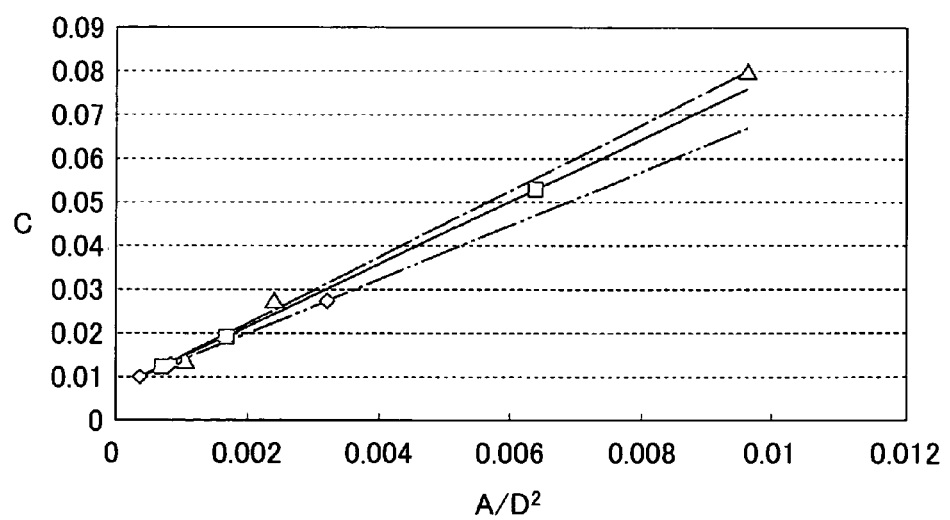
FIG. 7 is a graph showing the relationship of contrast and contrast index.

FIG. 7 is a graph showing the relationship of contrast and contrast index. The axis of ordinates represents the contrast C (illuminance unevenness), and the axis of abscissa represents the contrast index ($A/D^2$). Here, ♦ represents the case in which the amplitude A of the irregularity on the glass substrate 1 is 0.08 μm, ■ represents the case in which the amplitude A of the irregularity on the glass substrate 1 is 0.16 μm, and ▲ represents the case in which the amplitude A of the irregularity on the glass substrate 1 is 0.24 μm.

From FIG. 7, it is found out that the increment of the contrast C (illuminance unevenness) is proportional to the contrast index ($A/D^2$), namely, that the increment of the contrast C (illuminance unevenness) is proportional to the amplitude A of the irregularity on the glass substrate 1, and is inversely proportional to the value ($D^2$) of the square of the period D of the irregularity on the glass substrate 1. Thereby, it is found out that the period D has a greater influence on the contrast C (illuminance unevenness) than the amplitude A of the irregularity on the glass substrate 1.

Next, viewability φ of the light and dark pattern in the range of the spatial frequency of 2 to 500/mm is proportional to the contrast C (illuminance unevenness), and is inversely proportional to the period (λ) of illuminance. More specifically, the viewability φ is obviously proportional to C/λ, and therefore, the viewability φ is considered to be proportional to a viewability index value γ ($=A/D^3$).

Figure 8:
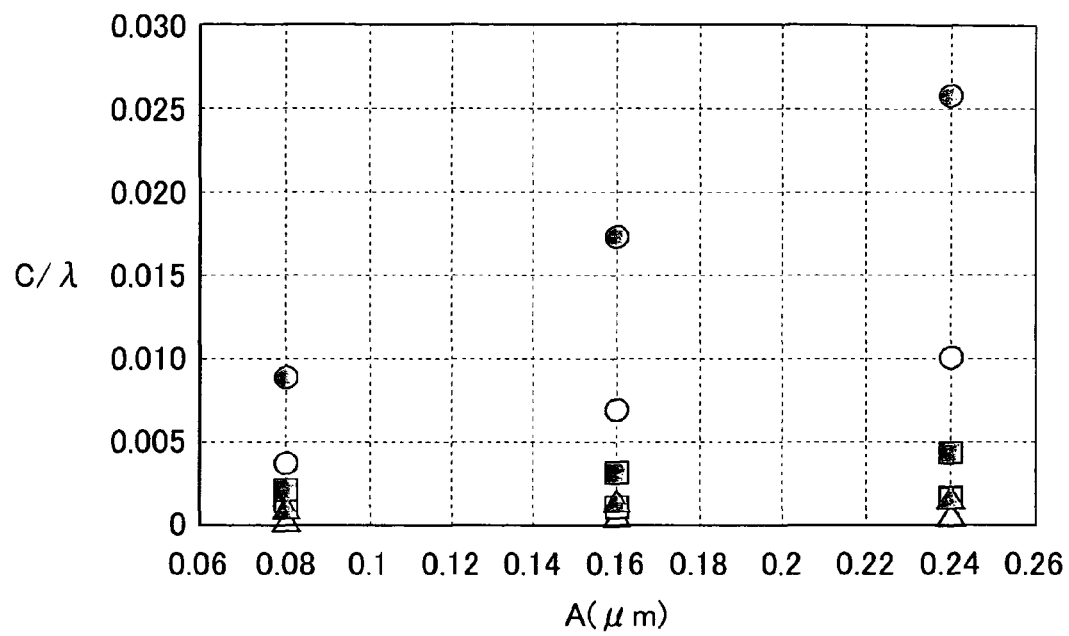
FIG. 8 is a graph showing the relationship of viewability and amplitude of irregularity on the glass substrate.

FIG. 8 is a graph showing the relationship of viewability and amplitude of the irregularity on the glass substrate. The axis of ordinates represents the viewability φ ($=C/\lambda$), and the axis of abscissa represents the amplitude A (μm) of the irregularity on the glass substrate 1. Here, ● represents the evaluation result of the image projected on the screen 22a (upper screen) with the period D of the irregularity on the glass substrate 1 being 5 mm, ■ is the evaluation result of the image projected on the screen 22a (upper screen) with the period D of the irregularity on the glass substrate 1 being 10 mm, ▲ is the evaluation result of the image projected on the screen 22a (upper screen) with the period D of the irregularity on the glass substrate 1 being 15 mm, ○ represents the evaluation result of the image projected on the screen 22b (lower screen) with the period D of the irregularity on the glass substrate 1 being 5 mm, □ represents the evaluation result of the image projected on the screen 22b (lower screen) with the period D of the irregularity on the glass substrate 1 being 10 mm, and Δ represents the evaluation result of the image projected on the screen 22b (lower screen) with the period D of the irregularity on the glass substrate 1 being 15 mm.

From FIG. 8, it is found out that the viewability $\phi$ ($=C/\lambda$) is larger in the image projected on the screen 22a (upper screen), and that the difference in viewability $\phi$ ($=C/\lambda$) in the cases of the screen 22a (upper screen) and the screen 22b (lower screen) tends to be more remarkable as the period D ($\mu$m) of the irregularity on the glass substrate 1 is smaller.

Figure 9:
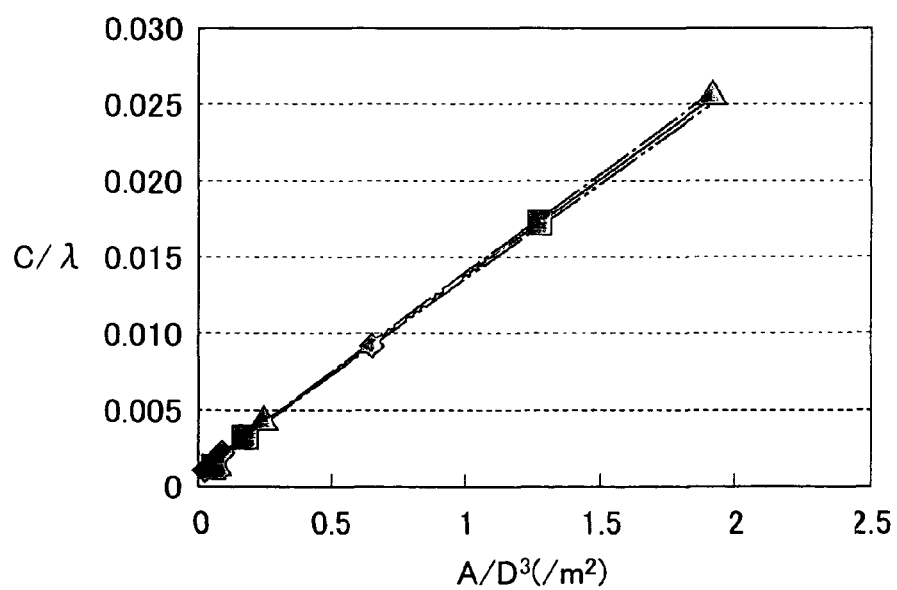
FIG. 9 is a graph showing the relationship between viewability and viewability index value.

FIG. 9 is a graph showing the relationship of viewability and viewability index value. The axis of ordinates represents the viewability $\phi$ ($=C/\lambda$), and the axis of abscissa represents the viewability index value $\gamma$ ($=A/D^3$). Here, ◆ represents the case in which the amplitude A of the irregularity on the glass substrate 1 is 0.08 $\mu$m, ■ represents the case in which the amplitude A of the irregularity on the glass substrate 1 is 0.16 $\mu$m, and ▲ represents the case in which the amplitude A of the irregularity on the glass substrate 1 is 0.24 $\mu$m.

From FIG. 9, it is found out that the viewability $\phi$ ($=C/\lambda$) is proportional to the viewability index value $\gamma$ ($=A/D^3$). More specifically, the viewability $\phi$ ($=C/\lambda$) is proportional to the amplitude A of the irregularity on the glass substrate 1, and is inversely proportional to the value ($D^3$) which is the cube of the period D of the irregularity on the glass substrate 1. Thereby, it is found out that the viewability $\phi$ ($=C/\lambda$) is more greatly affected by the period D than the amplitude A of the irregularity on the glass substrate 1.

Thus, the viewability $\phi$ ($=C/\lambda$) is proportional to the viewability index value $\gamma$ ($=A/D^3$), and therefore, by making the viewability index value $\gamma$ ($=A/D^3$) small, the viewability $\phi$ ($=C/\lambda$) can be made small, whereby the light and dark pattern can be made difficult to see.

Hereinafter, examples of the present invention will be described by using FIGS. 10 and 11.

EXAMPLE 1

Check of the reflectivities in the respective wavelengths (450 nm, 550 nm, 650 nm) and reflected images (observation of the reflected image (white display) of the rear projection television (RPTV) of 55 inches from the position of 1.5 m away) was performed for the glass substrate with the maximum value of the viewability index value $\gamma$ ($=A/D^3$) in measurement of the cut-off value of 0.8 to 8 mm being 0.02 or less (0.02), the integral value being 2.0 or less (1.93), and the reflection enhancing film constituted of aluminum (Al) being formed on one surface of the float glass plate by a sputtering method. Reflected image check was performed for the glasses with and without draw line control being carried out at the time of being manufactured by a float process.

In FIG. 10, ⊙ indicates "far beyond the good item reference level", ○ indicates "beyond the good item reference level", Δ represents "equivalent to the good item reference level", and × represents "below the good item reference level".

As a result, the reflectivities in the respective wavelengths (450 nm, 550 nm, 650 nm) were 96%, 94% and 91%. As for the reflected image check, the glass substrate with the draw line control being carried out was beyond the good item reference level though a light and dark pattern was recognized, whereas the glass substrate with the draw line control being carried out did not reach the good item reference level with a light and dark pattern being recognized.

EXAMPLE 2

Check of the reflectivities in the respective wavelengths (450 nm, 550 nm, 650 nm) and the reflected images (observation of a reflected image (white display) of the rear projection television (RPTV) of 55 inches from the position of 1.5 m away) was performed for the glass substrate with the maximum value of the viewability index value $\gamma$ ($=A/D^3$) in measurement of the cut-off value of 0.8 to 8 mm being 0.01 or less (0.008), the integral value being 1.0 or less (0.82), and a reflection enhancing film constituted of aluminum (Al) being formed on one surface of the float glass plate by the sputtering method. Reflected image check was performed for the glass substrates with and without draw line control being carried out at the time of being manufactured by the float process.

As a result, the reflectivities in the respective wavelengths (450 nm, 550 nm, 650 nm) were 96%, 94% and 91%. As for the reflected image check, the glass substrates were completely beyond the good item reference level with no bright-dark pattern being recognized irrespective of applying or not the draw line control.

EXAMPLE 3

Check of the reflectivities in the respective wavelengths (450 nm, 550 nm, 650 nm) and reflected images (observation of the reflected image (white display) of the rear projection television (RPTV) of 55 inches from the position of 1.5 m away) was performed for the glass substrate with the maximum value of the viewability index value $\gamma$ ($=A/D^3$) in the measurement of the cut-off value of 0.8 to 8 mm being 0.006 or less (0.006), the integral value being 0.6 or less (0.48), and a reflection enhancing film constituted of aluminum (Al) being formed on one surface of the float glass plate by the sputtering method. Reflected image check was carried out for the glass substrates with and without draw line control being carried out at the time of being manufactured by the float process.

As a result, the reflectivities in the respective wavelengths (450 nm, 550 nm, 650 nm) were 96%, 94% and 91%. As for the reflected image check, the glass substrates were completely beyond the good item reference level with no light and dark pattern being recognized irrespective of applying or not the draw line control.

Next, a liquid crystal panel according to another embodiment of the present invention will be described in detail with reference to the drawings.

FIG. 12 is a sectional view schematically showing the configuration of the liquid crystal panel according to another embodiment of the present invention.

In FIG. 12, a liquid crystal panel 30 includes glass substrates 31 and 32 opposed to each other, a liquid crystal layer 34 injected between the two glass substrates 31 and 32, and spherical spacers 33a and 33b which are disposed to abut on each of opposed surfaces of the two glass substrates 31 and 32.

In the liquid crystal panel 30, crests and valleys occur to the glass substrate 31 due to the manufacturing process (float process) of the glass substrate 31, and therefore, the spacers 33a which abut on the glass substrate 31 and the spacers 33b which do not abut on the glass substrate 31 exist. More specifically, when the difference in height of the crest and valley is set as the amplitude A, and the length of one period from a certain valley to the adjacent valley is set as the period D, if the valleys at both ends of the period D abut on the two spacers 33a, the spacer 33b disposed in the portion corresponding to the crest existing between the valleys at both the ends is disposed at the position away from the glass substrate 31 by the amplitude A from the glass substrate 31.

However, in reality, the liquid crystal layer 34 is injected between the glass substrates 31 and 32, and the liquid crystal layer 34 has surface tension. Therefore, the glass substrate 31 is attracted to the liquid crystal layer 34 by the surface tension, and the amplitude A is corrected. Thus, the distance between the spacer 33b and the glass substrate 31 is assumed to be $\Delta A$ in reality.

Thus, the present inventors assumed the glass substrate 31 between the adjacent spacers 33a as a beam and applied the following dynamic model for the abovementioned phenomenon.

Figure 13:
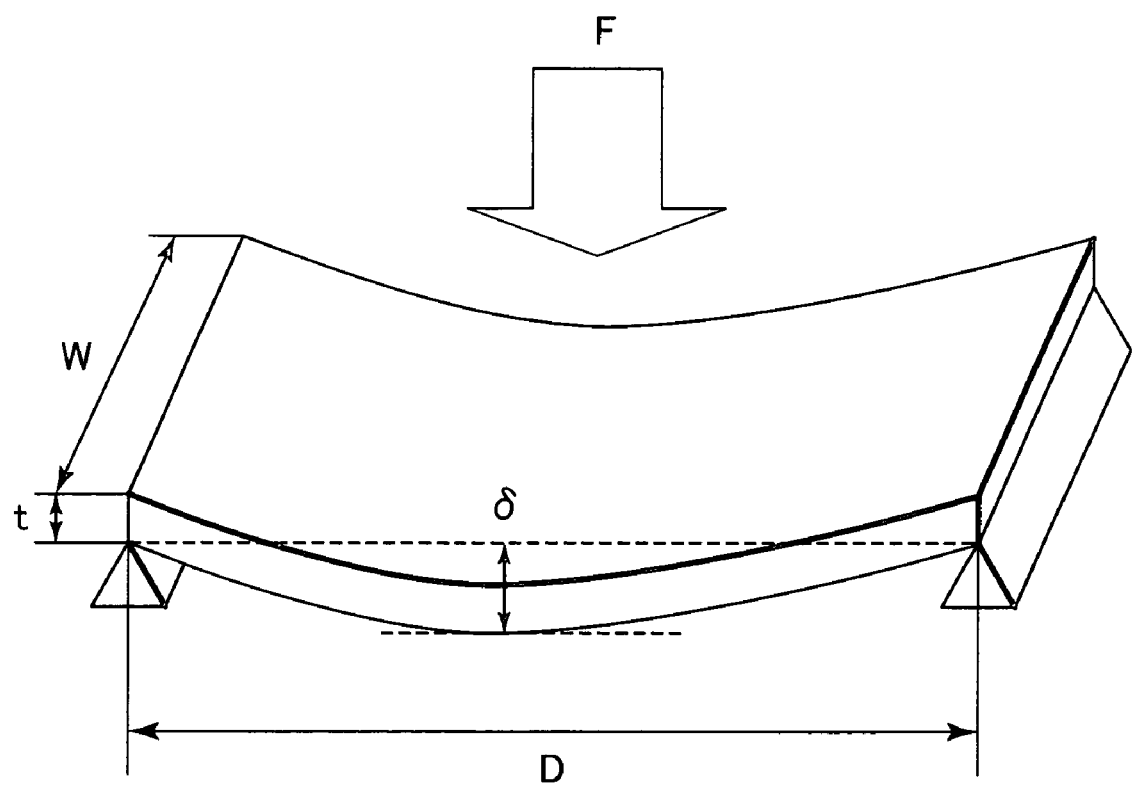
FIG. 13 is a view schematically showing a dynamic model in the case in which the glass substrate between adjacent spacers is assumed to be a beam.

FIG. 13 is a view schematically showing the dynamic model in the case in which the glass substrate between the adjacent spacers is assumed to be a beam.

In FIG. 13, the beam of a width of W and a plate thickness of t is supported by triangular poles so that the beam length is set to D. In this case, when a load F is vertically applied from above the beam, the beam bends by $\delta$. At this time, a geometrical moment of inertia I of the beam is expressed by the following formula (4), $$I = t^3 \times W / 12 \quad (4)$$

further, when the geometrical moment of inertia I is used, bending $\delta$ is expressed by the following formula (5).

$$\delta = F \times D^3 / (4 \times E \times I) \quad (5)$$

(where E is Young's modulus.)

By the above described formulae (4) and (5), the bending $\delta$ is as shown in the following formula (6).

$$\Delta = F \times D^3 / (4 \times E \times W \times t^3) \quad (6)$$

When the dynamic model of FIG. 13 is applied to the liquid crystal panel of FIG. 12, the load F in FIG. 13 corresponds to the surface tension in FIG. 12. Here, when the attracting amount (bending $\delta$) of the glass substrate 31 by the surface tension is equal to the amplitude A or more (A/$\delta \leq 1$, hereinafter, "A/$\delta$" will be called "wave correction index value".), the wave of the glass substrate 13 is corrected by the surface tension.

Further, from the above described formula (6), the bending $\delta$ is proportional to the cube of the period D, and therefore, the relationship of the abovementioned viewability index value $\gamma$ (=A/D$^3$) and the wave correction index value A/$\delta$ is expressed by the following formula (7), $$A/\delta \propto A/D^3 = \gamma \quad (7)$$

the wave correction index value A/$\delta$ is proportional to the viewability index value $\gamma$. More specifically, it is conceivable that the wave correction index value A/$\delta$ can be expressed by using the viewability index value $\gamma$ in the substitution way.

Incidentally, the wave of the glass substrate 31 is generally corrected more easily, as the attraction amount (bending $\delta$) of the glass substrate 31 by the surface tension is larger, or the amplitude A is smaller. When this is applied to the correction index value A/$\delta$, the wave of the glass substrate 31 is corrected more easily as the wave correction index value A/$\delta$ is smaller. Meanwhile, the wave correction index value A/$\delta$ is proportional to the viewability index value $\gamma$, and therefore, the wave of the glass substrate 31 is corrected more easily as the viewability index value $\gamma$ is smaller. As a result, color unevenness due to waviness is suppressed.

Here, the present inventors produced a plurality of glass substrates which have crests and valleys (have wave) and differ in the amplitude A from one another by the float process with draw line control. The present inventors produced a plurality of liquid crystal panels by using the plurality of glass substrates 31, and observed color unevenness of each of the liquid crystal panels. Through the observation, the present inventors has found out that in the liquid crystal panel using the glass substrate 31 of a plate thickness of 0.2 to 1.1 mm ($\pm 0.1$ mm), the amplitude A of $9.8 \times 10^{-9}$ m, and the period D of $2.93 \times 10^{-2}$ m, color unevenness is not observed. This is considered to be because the wave of the glass substrate 31 has been corrected by the surface tension of the liquid crystal layer 34. When the amplitude A and the period D at this time are substituted into the above described formula (1), the viewability index value $\gamma$ in a range of spatial frequencies 2 to 500 by the spectral analysis of the filtered waviness curve in the measurement condition of the cut-off value of 0.8 to 8 mm is the value shown by the following formula (8).

$$\gamma = A/D^3 = 9.8 \times 10^{-9} / (2.93 \times 10^{-2})^3 \approx 0.0004 \quad (8)$$

From the above, it is found out that when at least the viewability index value $\gamma$ is 0.0004 or less, the wave of the glass substrate 31 is corrected by the surface tension of the liquid crystal layer 34 to suppress color unevenness, and the color unevenness is not observed.

Further, the viewability index value $\gamma$ is inversely proportional to the cube of the period D, and therefore, the larger the period D, more easily the wave of the glass substrate 31 is corrected. Here, in the condition in which the abovementioned color unevenness is not observed, the period D is $2.93 \times 10^{-2}$ m, and therefore, it has been inferred that when at least the period D is $3.0 \times 10^{-2}$ m or more, color unevenness is suppressed.

Further, from the observation of color unevenness of each of the liquid crystal panels, the present inventors has obtained the knowledge that when the amplitude A is $5.0 \times 10^{-9}$ or less in the glass substrate 31, color unevenness is not observed in the liquid crystal panel substantially irrespective of the period D.

In the discussion based on the abovementioned dynamic model, the smaller the period D, the larger the viewability index value $\gamma$, the wave of the glass substrate 31 is more difficult to correct, and color unevenness is more easily observed. Accordingly, it is difficult to explain the above described knowledge based on the dynamic model. Therefore, the present inventors paid attention to the fact that human brightness/darkness (contrast) recognition depends on the spatial frequency, and has inferred the following hypothesis by analogy.

Figure 14:
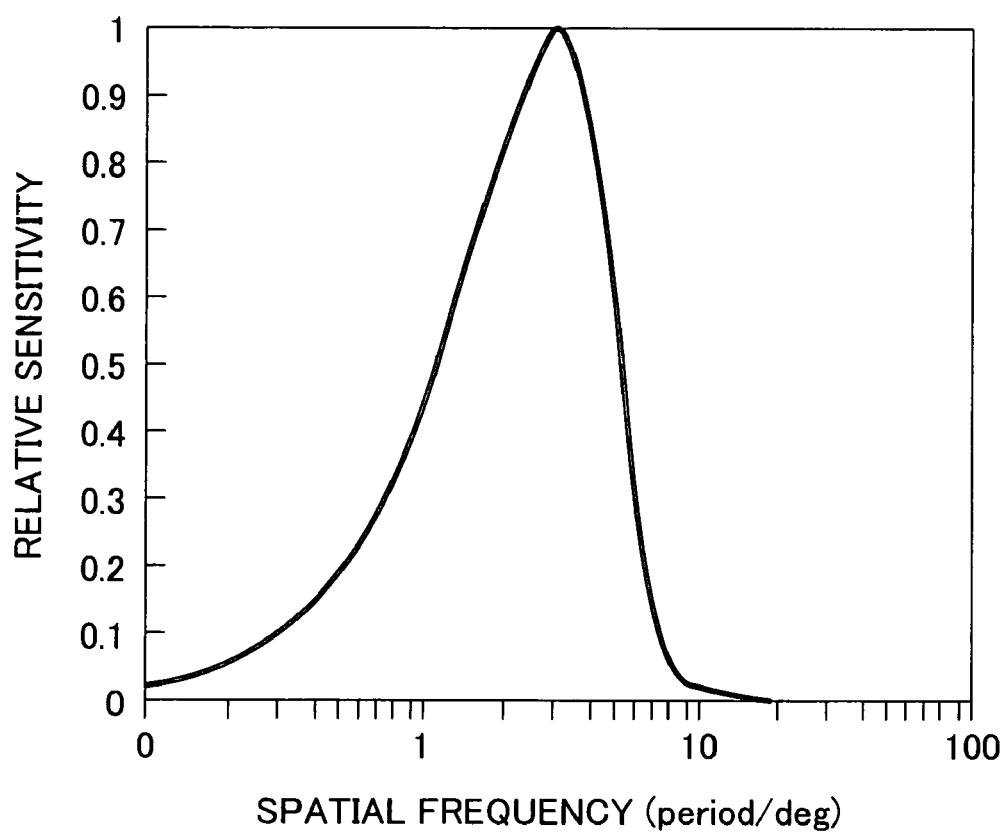
FIG. 14 is a graph showing relative sensitivity of brightness/darkness recognition of a human being.

More specifically, as shown in the graph of FIG. 14, relative sensitivity of human brightness/darkness recognition (sensitivity standardized with the maximum sensitivity as 1) shows the extreme value (1.0 in the relative sensitivity) in a specific spatial frequency (3 periods/deg in FIG. 14), and reduces in the spatial frequencies smaller or larger than the specific spatial frequency. What is noteworthy is that even in the spatial frequencies smaller than the specific spatial frequency, the relative sensitivity reduces. Here, the spatial frequency corresponds to the period D, and therefore, it is found out from the graph of FIG. 14 that the relative sensitivity reduces when the period D becomes small. Reduction in relative sensitivity means none other than that an observer (human being) becomes insensitive to occurrence of color unevenness which occurs to the liquid crystal panel, that is, becomes hard to observe color unevenness. Accordingly, as the period D becomes smaller, the more difficult it becomes to observe the color unevenness.

Further, when it is expressed by using the above described formula (1) that the amplitude A is $5.0 \times 10^{-9}$ m or less, it is equivalent to the range of the viewability index value $\gamma$ expressed by the following formula (9).

$$\gamma = A/D^3 \leq 5.0 \times 10^{-9}/D^3 \qquad (9)$$

(where unit of D is m).

From the above, it is inferred that when the amplitude A is $5.0 \times 10^{-9}$ m or less, that is, when the viewability index value $\gamma$ is $5.0 \times 10^{-9}/D^3$ (/m²) or less, due to the synergistic effect consisting of the smallness of the original amplitude making color unevenness difficult to observe and that the reduction in the relative sensitivity of the human brightness/darkness recognition in the spatial frequencies except for a certain specific spatial frequency, color unevenness is not observed in the liquid crystal panel with any period D.

From the above, it has been inferred that color unevenness is not observed in the liquid crystal panel when the viewability index value $\gamma$ in a range of spatial frequencies 2 to 500/mm by the spectral analysis of the filtered waviness curve is 0.0004 or less, or the viewability index value $\gamma$ is $5.0 \times 10^{-9}/D^3$ (/m²) or less in the measurement condition of at least the cut-off value of 0.8 to 8 mm in the liquid crystal panel including the glass substrate 31 of a plate thickness of 0.2 to 1.1 mm (±0.1 mm). When the relationship of them is shown in the graph, the graph in FIG. 15 is obtained.

Figure 15:
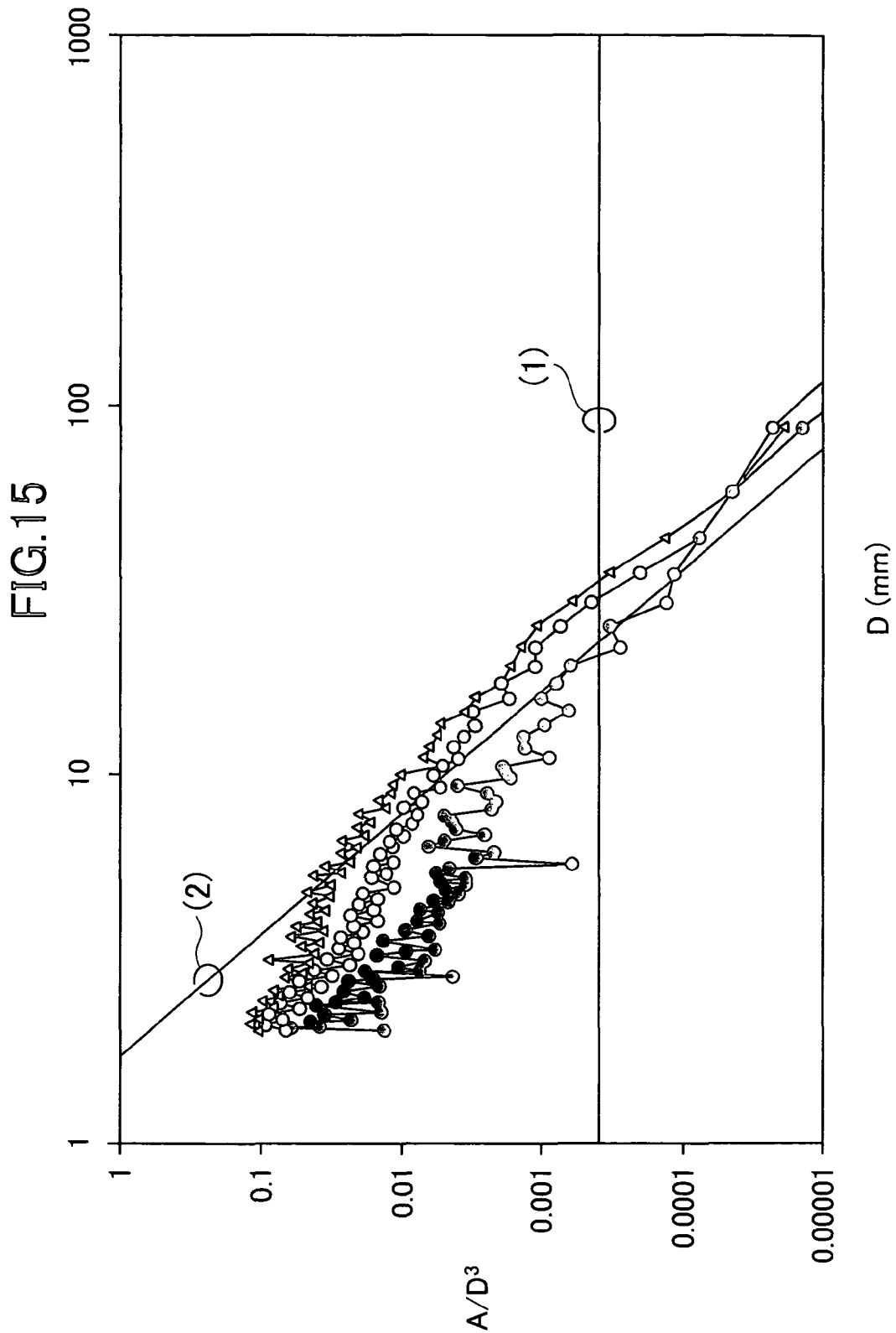
FIG. 15 is a graph showing an observation limit of color unevenness in a liquid crystal panel.

FIG. 15 is a graph showing the observation limit of color unevenness in the liquid crystal panel. The axis of ordinates represents the viewability index value $\gamma$ (=A/D³), and the axis of abscissa represents the period D in the glass substrate 31.

In the graph of FIG. 15, a reference line (1) is a line corresponding to the viewability index value $\gamma$=0.0004, and a reference line (2) is a line corresponding to the viewability index value $\gamma$=5.0×10⁻⁹/D³ (m²). The broken line plotted with "Δ" and the broken line plotted with "○" show the data of the upper surfaces and the data of the lower surfaces of the glass substrates (samples 1) produced by the conventional float process, respectively, and the broken line plotted with "●" shows the data of the glass substrates for the liquid crystal panel according to the present embodiment (samples 2). Samples 2 are also produced by the float process, but differs from samples 1 in the various control values in the draw line control.

Here, when the liquid crystal panels were produced by using each sample and the observation of color unevenness was performed in the liquid crystal panels, color unevenness was observed in samples 1, whereas color unevenness was not observed in samples 2. In the graph of FIG. 15, the data which are located beyond the reference line (1) and the reference line (2) exist in samples 1, but data located beyond the reference line (1) and the reference line (2) do not exist in samples 2. Specifically, it has been found out that the reference line (1) and the reference line (2) in the graph of FIG. 15 show the observation limit of color unevenness.

From the observation result of color unevenness of samples 1 and 2 and data (the period D, the viewability index value $\gamma$), through the graph of FIG. 15, it has been found out that in the liquid crystal panel including the glass substrate 31 of a plate thickness of 0.2 to 1.1 mm (±0.1 mm), when at least the viewability index value $\gamma$ is 0.0004 or less, or the viewability index value $\gamma$ is $5.0 \times 10^{-9}/D^3$ (/m²) or less, color unevenness is not observed.

The abovementioned samples 2 were produced by the float process, but the glass substrate for the liquid crystal panel according to the present embodiment may be the glass substrate produced by the float process with polishing being applied more or less as long as the glass substrate satisfies the abovementioned conditions (in the measurement condition of the cut-off value of 0.8 to 8 mm, the viewability index value $\gamma$ in a range of spatial frequencies 2 to 500/mm by the spectral analysis of the filtered waviness curve is 0.0004 or less, or the viewability index value $\gamma$ is $5.0 \times 10^{-9}/D^3$ (/m²) or less), and as the amount of the polishing, 5 µm or less is proper from the aspect of productivity (reduction in the number of manufacturing process steps, reduction in quality control process steps).

Further, the present inventers studied another index value $\epsilon$ defined by A/D as another index value concerning the observation limit of color unevenness.

Figure 16:
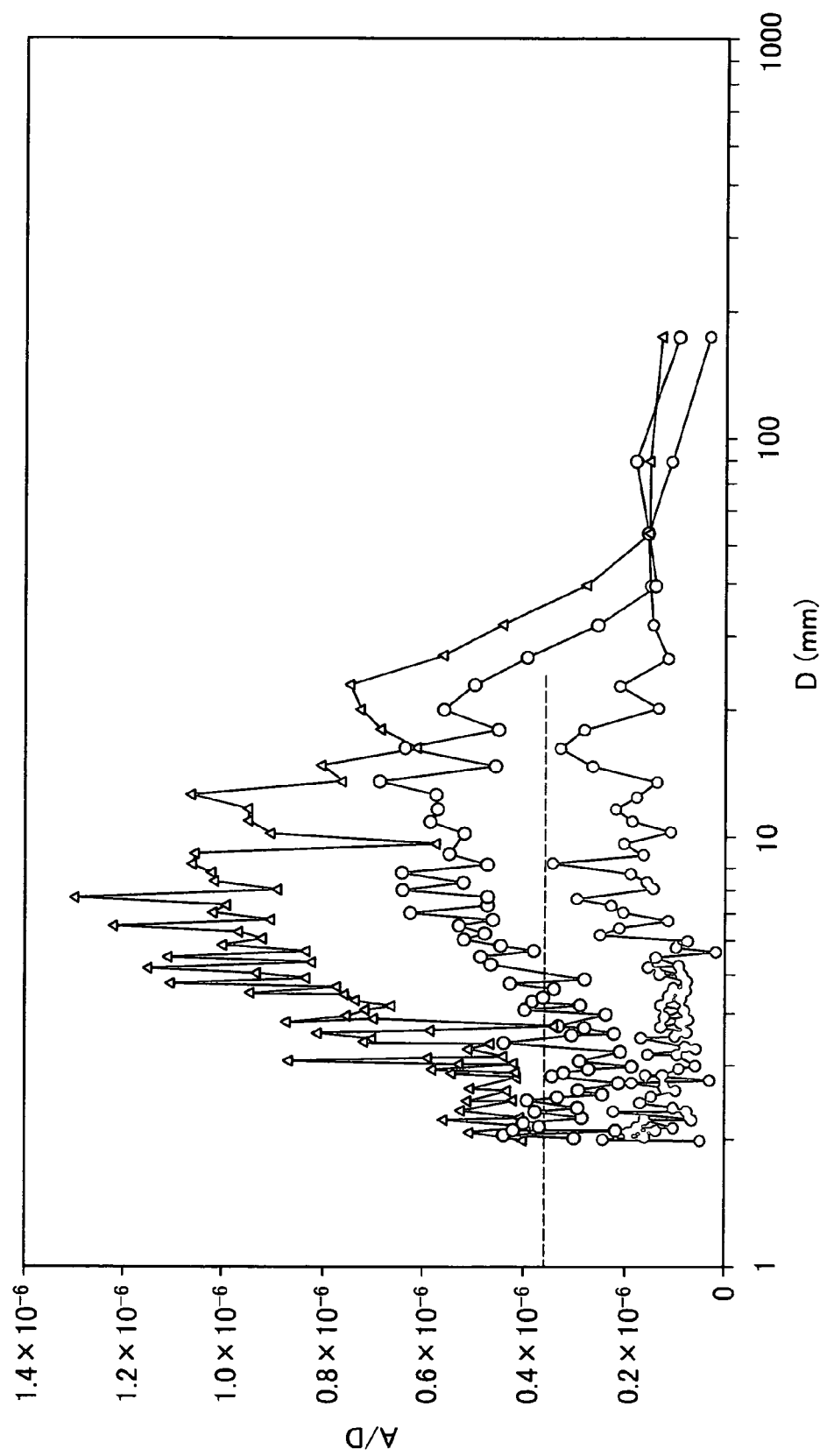
FIG. 16 is a graph showing the relationship of other index values in each sample and a period in the glass substrate.

FIG. 16 is a graph showing the relationship of the other index value in each sample and the period in the glass substrate. The axis of ordinates represents the other index value $\epsilon$, and the axis of abscissa represents the period D (mm) in the glass substrate 31.

In the graph of FIG. 16, respective data shown by "Δ", "○" and "●" correspond to the respective data of samples 1 and 2 in the graph of FIG. 15. Here, as described above, in the samples 1 which corresponds to "Δ" and "○", color unevenness was observed, and in samples 2 corresponding to "●", color unevenness was not observed. Meanwhile, the other index values $\epsilon$ in samples 1 are larger than $3.5 \times 10^{-7}$ (shown by the dashed line in the figure) in the range of the period D of 8 to 20 mm, and the other index values $\epsilon$ in samples 2 are $3.5 \times 10^{-7}$ or less in the range of the period D of 8 to 20 mm.

From the above, it has been found out that when the other index value $\epsilon$ is $3.5 \times 10^{-7}$ or less in the range of the period D of 8 to 20 mm, color unevenness is not observed.

INDUSTRIAL APPLICABILITY

According to the first aspect of the present invention, in the measurement condition of the cut-off value of 0.8 to 8 mm, the maximum value of the viewability index value $\gamma$ for each spectral of each spatial frequency is 0.02 (/m²) or less, and the integral value is 2.0 (/m³) or less. Therefore, the display quality for a light and dark pattern can be improved.

According to the first aspect of the present invention, in the measurement condition of the cut-off value of 0.8 to 8 mm, the maximum value of the viewability index value $\gamma$ for each spectral of each spatial frequency is 0.01 (/m²) or less, and the integral value is 1.0 (/m³) or less, which exceeds the good item reference level of the unevenness of the reflective mirror. Thus, total inspection by visual observation can be made unnecessary.

According to the first aspect of the present invention, in the measurement condition of the cut-off value of 0.8 to 8 mm, the maximum value of the viewability index value $\gamma$ for each spectral at each spatial frequency is 0.006 (/m²) or less, and the integral value is 0.6 (/m³) or less, which exceed the good item reference level for the unevenness of the reflective mirror. Thus, cost can be reduced by increase in the degree of freedom of cutting work.

According to the first aspect of the present invention, in the measurement condition of the cut-off value of 0.8 to 25 mm, the maximum value of the viewability index value $\gamma$ for each spectral at each spatial frequency is 0.2 (/m²) or less, and the integral value is 20.0 (/m³) or less. Therefore, the display quality for a light and dark pattern can be improved.

According to the first aspect of the present invention, in the measurement condition of the cut-off value of 0.8 to 25 mm, the maximum value of the viewability index value $\gamma$ at each spectral at each spatial frequency is 0.1 (/m²) or less, and the integral value is 10.0 (/m³) or less, which exceed the good item reference level of the reflective mirror. Therefore, total inspection by visual observation can be made unnecessary.

According to the first aspect of the present invention, in the measurement condition of the cut-off value of 0.8 to 25 mm, the maximum value of the viewability index value γ at each spectral at each spatial frequency is 0.06 (/m²) or less, and the integral value is 6.0 (/m³) or less, which is far beyond the good item reference level of the unevenness of the reflection mirror, and cost can be reduced by increase in the degree of freedom of cutting work.

According to the third aspect of the present invention, the glass substrate for a liquid crystal panel has the viewability index value γ of 0.0004 (/m²) or less, or the viewability index value γ of $5.0 \times 10^{-9}/D^3$ (/m²) or less in the measurement condition of the cut-off value of 0.8 to 8 mm, and therefore, display quality for color unevenness can be improved.

According to the third aspect of the present invention, the glass substrate for a liquid crystal panel is manufactured by a float process. Therefore, the number of manufacture process steps and quality control steps can be reduced, and thereby, cost can be reduced.

According to the third aspect of the present invention, when the period of the filtered waviness curve of the glass substrate for a liquid crystal panel is not less than 2 mm and less than 8 mm, the other index value ε is $3.5 \times 10^{-7}$ or less. Therefore, display quality for color unevenness can be reliably improved.

The invention claimed is:

1. A glass substrate for a reflective mirror, wherein:
   in a measurement condition of a cut-off value of 0.8 to 8 mm, a maximum amplitude of a filtered waviness curve is 0.1 μm or less, a maximum value of a viewability index value γ expressed by the following formula (1) in a range of spatial frequencies of 2 to 500/mm by spectral analysis of said filtered waviness curve is 0.02 (/m²) or less, $$\gamma = A/D^3 \quad (1)$$

(where A represents each amplitude (m) in a range of spatial frequencies of 2 to 500/mm, and D represents each period (m) in a range of spatial frequencies of 2 to 500/mm), and
   an integral value of said viewability index value γ is 2.0 (/m³) or less.

2. The glass substrate for a reflective mirror according to claim 1, wherein:
   a maximum value of said viewability index value γ is 0.01 (/m²) or less, and an integral value of said viewability index value γ is 1.0 (/m³) or less.

3. The glass substrate for a reflective mirror according to claim 2, wherein:
   the maximum value of said viewability index value γ is 0.006 (/m²) or less, and the integral value of said viewability index value γ is 0.6 (/m³) or less.

4. A reflective mirror, comprising the glass substrate for a reflective mirror according to claim 3.

5. A reflective mirror, comprising the glass substrate for a reflective mirror according to claim 2.

6. A reflective mirror, comprising the glass substrate for a reflective mirror according to claim 1.

7. A glass substrate for a reflective mirror, wherein:
   in a measurement condition of a cut-off value of 0.8 to 25 mm, a maximum amplitude of a filtered waviness curve is 0.5 μm or less, a maximum value of a viewability index value γ expressed by the following formula (1) in a range of spatial frequencies of 2 to 500/mm by spectral analysis of said filtered waviness curve is 0.2 (/m²) or less, $$\gamma = A/D^3 \quad (1)$$

(where A represents each amplitude (m) in a range of spatial frequencies of 2 to 500/mm, and D represents each period (m) in a range of spatial frequencies of 2 to 500/mm), and
   an integral value of said viewability index value γ is 20.0 (/m³) or less.

8. The glass substrate for a reflective mirror according to claim 7, wherein:
   a maximum value of said viewability index value γ is 0.1 (/m²) or less, and an integral value of said viewability index value γ is 10.0 (/m³) or less.

9. The glass substrate for a reflective mirror according to claim 8, wherein:
   the maximum value of said viewability index value γ is 0.06 (/m²) or less, and an integral value of said viewability index value γ is 6.0 (m³) or less.

10. A reflective mirror, comprising the glass substrate for a reflective mirror according to claim 9.

11. A reflective mirror, comprising the glass substrate for a reflective mirror according to claim 8.

12. A reflective mirror, comprising the glass substrate for a reflective mirror according to claim 7.

13. A glass substrate for a liquid crystal panel, wherein:
   a plate thickness is 0.2 to 1.1 mm (±0.1 mm), and in a measurement condition of a cut-off value of 0.8 to 8 mm, a viewability index value γ expressed by the following formula (1) in a range of spatial frequencies of 2 to 500/mm by spectral analysis of a filtered waviness curve is 0.0004 (/m²) or less, or the viewability index value γ is $5.0 \times 10^{-9}/D^3$ (/m²) or less, $$\gamma = A/D^3 \quad (1)$$

(where A represents an amplitude (m) of the filtered waviness curve of said glass substrate, and D represents a period (m) of the filtered waviness curve of said glass substrate).

14. The glass substrate for a liquid crystal panel according to claim 13, which is manufactured by a float process.

15. A liquid crystal panel comprising two glass substrates opposed to each other, a liquid crystal layer interposed between said two glass substrates, and spacers disposed to abut on each of opposed surfaces of said two glass substrates, wherein:
   at least one of said glass substrates is the glass substrate for a liquid crystal panel according to claim 14.

16. The glass substrate for a liquid crystal panel according to claim 14, wherein:
   when the period of the filtered waviness curve is not less than 2 mm and less than 8 mm, another index value ε expressed by the following formula (2) is $3.5 \times 10^{-7}$ or less $$\epsilon = A/D \quad (2).$$

17. A liquid crystal panel comprising two glass substrates opposed to each other, a liquid crystal layer interposed between said two glass substrates, and spacers disposed to abut on each of opposed surfaces of said two glass substrates, wherein:

at least one of said glass substrates is the glass substrate for a liquid crystal panel according to claim 16.

18. The glass substrate for a liquid crystal panel according to claim 13, wherein:

when the period of the filtered waviness curve is not less than 2 mm and less than 8 mm, another index value $\epsilon$ expressed by the following formula (2) is $3.5 \times 10^{-7}$ or less $$\epsilon = A/D \qquad (2).$$

19. A liquid crystal panel comprising two glass substrates opposed to each other, a liquid crystal layer interposed between said two glass substrates, and spacers disposed to abut on each of opposed surfaces of said two glass substrates, wherein:

at least one of said glass substrates is the glass substrate for a liquid crystal panel according to claim 18.

20. A liquid crystal panel comprising two glass substrates opposed to each other, a liquid crystal layer interposed between said two glass substrates, and spacers disposed to abut on each of opposed surfaces of said two glass substrates, wherein:

at least one of said glass substrates is the glass substrate for a liquid crystal panel according to claim 13.

* * * * *